(12) United States Patent
Hsu et al.

(10) Patent No.: US 8,762,775 B2
(45) Date of Patent: *Jun. 24, 2014

(54) EFFICIENT METHOD FOR HANDLING STORAGE SYSTEM REQUESTS

(75) Inventors: Felix S. Hsu, Fremont, CA (US); Ron Barzel, Truckee, CA (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/789,504

(22) Filed: May 28, 2010

(65) Prior Publication Data
US 2011/0296240 A1   Dec. 1, 2011

(51) Int. Cl.
*G06F 11/00* (2006.01)

(52) U.S. Cl.
USPC ........................................................... 714/18

(58) Field of Classification Search
USPC .............................. 714/18; 707/827; 709/203
See application file for complete search history.

(56) References Cited

U.S. PATENT DOCUMENTS

| | | | | |
|---|---|---|---|---|
| 5,978,848 A * | 11/1999 | Maddalozzo et al. | ......... | 709/227 |
| 6,269,382 B1 * | 7/2001 | Cabrera et al. | ......... | 1/1 |
| 6,785,786 B1 * | 8/2004 | Gold et al. | ......... | 711/162 |
| 7,917,696 B2 * | 3/2011 | Peters et al. | ......... | 711/114 |
| 8,019,726 B2 * | 9/2011 | Ueoka | ......... | 707/651 |
| 8,176,357 B2 * | 5/2012 | Hsu et al. | ......... | 714/4.1 |
| 2002/0018245 A1 * | 2/2002 | Saito et al. | ......... | 358/468 |
| 2002/0147772 A1 * | 10/2002 | Glommen et al. | ......... | 709/203 |
| 2005/0160168 A1 * | 7/2005 | Takanashi et al. | ......... | 709/224 |
| 2006/0106852 A1 * | 5/2006 | Siddall et al. | ......... | 707/101 |
| 2009/0037790 A1 * | 2/2009 | Ueda et al. | ......... | 714/752 |
| 2009/0177836 A1 * | 7/2009 | Mimatsu | ......... | 711/111 |
| 2009/0248693 A1 * | 10/2009 | Sagar et al. | ......... | 707/10 |
| 2010/0274838 A1 * | 10/2010 | Zemer | ......... | 709/203 |

* cited by examiner

Primary Examiner — Yair Leibovich

(57) ABSTRACT

A method of storing and retrieving digital files from a storage system comprising requesting one or more files through a server which compares the timestamp of each file to the present time to determine an elapsed time for each file. The server then requests a storage system for each file having an elapsed time less than or equal to a pre-determined time limit using an internal-retry request and requests from the storage system each file having an elapsed time greater than a pre-determined time limit using a fail-fast request.

22 Claims, 7 Drawing Sheets

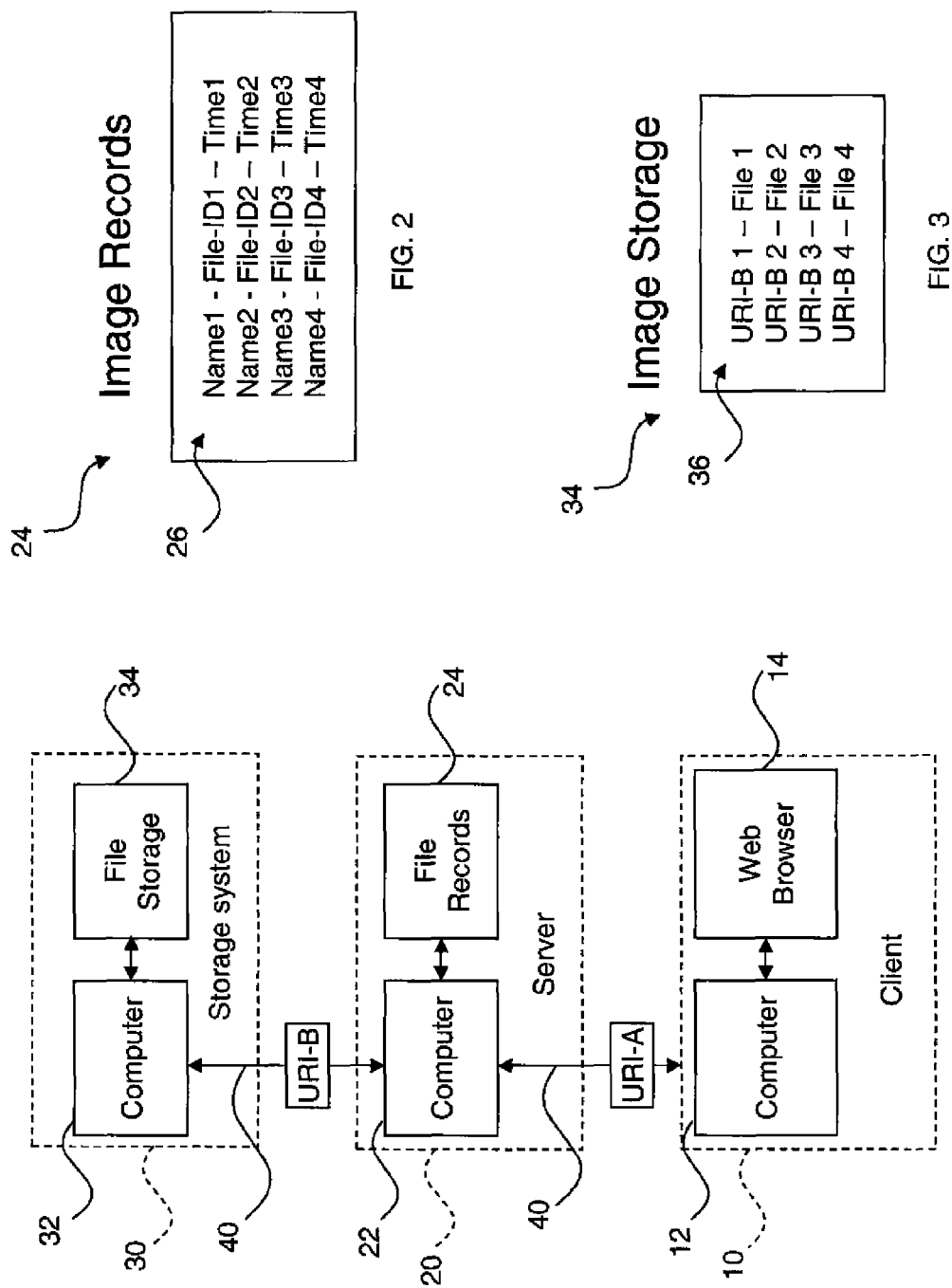

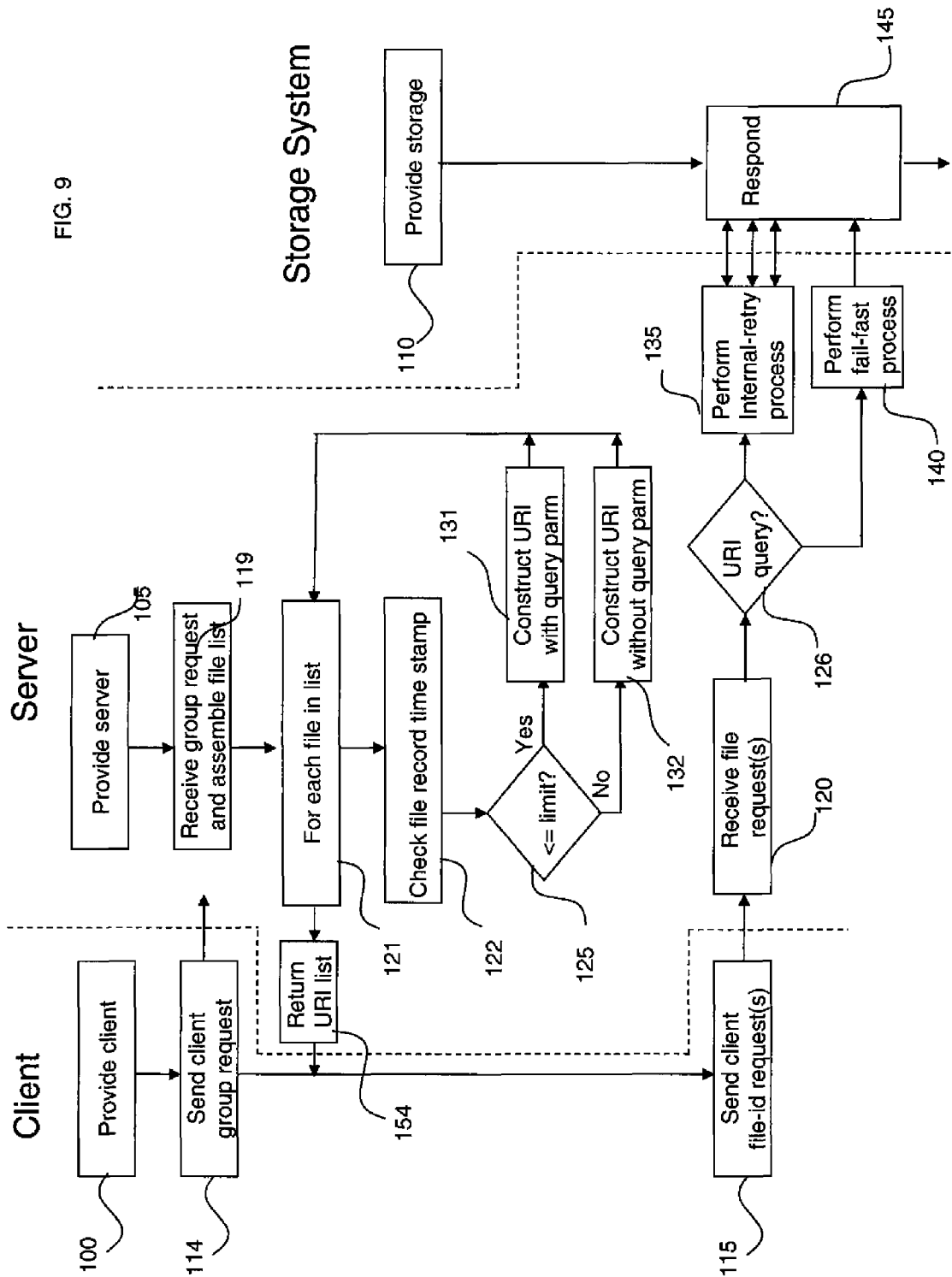

EFFICIENT METHOD FOR HANDLING STORAGE SYSTEM REQUESTS

CROSS REFERENCE TO RELATED APPLICATIONS

Reference is made to commonly assigned, co-pending U.S. patent application Ser. No. 12/789,507 by Hsu et al., filed of even date herewith entitled "System For Handling Storage System Requests", the disclosure of which is incorporated herein by reference in its entirety.

FIELD OF THE INVENTION

The present invention relates to efficient interactions between computers in a network, and particularly to servers that receive client requests and manage their interactions with a file storage system.

BACKGROUND OF THE INVENTION

Networks of computers are widely used for file storage. Such computer networks typically include multiple computers connected to a common computer communication network. In some computer networks, a server computer provides services to a client computer. The client computer can be a remote computer that accesses services over the computer network, for example the internet. The server computer, in turn can access other networked computers providing services useful to the client.

Task responsiveness is an important characteristic of network-provided file storage services. If the server responds too slowly to a client request, the user operating the client will become frustrated and may even abandon the task. Hence, efficiency, and especially responsiveness, is an important issue for network services.

Responsiveness can be improved by increasing the network bandwidth to improve communication rates. This is particularly useful when large amounts of data are communicated between the various network computers, especially between a client and a server, and between a server and a networked storage system. One example of large data sets is a set of digital images. The time required to transmit digital images from a client to a server over a network can be lengthy. Responsiveness can also be improved by increasing the capacity of the various network elements, for example by using faster computers with more memory.

While increasing the performance of network devices is useful, there remains a need for improving networked computer services to provide responsive and efficient performance for given network and computing resources.

SUMMARY OF THE INVENTION

In accordance with the present invention, there is provided a method of storing electronic files comprising receiving a digital file, and a request for storing the file, transmitted over a communication network from a network connected computer. The file and a request for storing the file is then forwarded to a storage system that is coupled to the communication network. This starts a process in the storage system for storing the digital file therein. A later arriving request to retrieve the digital file requires determining an elapsed time from the time of receiving the request for storing the digital image to the present time. The request is passed to the storage system to retrieve the digital image and, if a no-file message is sent from the storage system, then the message is forwarded to the network connected computer if the elapsed time is greater than a pre-programmed time-out time.

Another preferred embodiment of the present invention comprises receiving a digital file and an electronic request for storing the digital file sent over a communication network from a network connected computer. The digital file is sent to a storage system that is coupled to the communication network, to start a process for storing the digital file in the storage system. A request to retrieve the digital image, sent over the communication network, from the network connected computer results in determining an elapsed time from the time of receiving the request for storing the digital image to the time of receiving the request to retrieve the digital image. The storage system is then requested to retrieve the digital image. The requesting step is retried in response to receiving a no-file message from the storage system and if the elapsed time is less than a pre-programmed time-out length.

Another preferred embodiment of the present invention includes a method of managing file resource requests over a network comprising providing a client and a server with a plurality of file records. The file records include a timestamp indicating the time at which a request was made to create corresponding files. The server is responsive to client file requests for storing and retrieving files to/from a storage system. The storage system is responsive to file requests from the server. A client request for one or more files goes to the server which compares the timestamp of each file to the present time to determine an elapsed time for each file. The server then requests each file having an elapsed time less than or equal to a pre-determined time limit from the storage system with an internal-retry request and requesting each file having an elapsed time greater than a pre-determined time limit from the storage system with a fail-fast request.

The present invention has the advantage that responsiveness to a user is improved for a client computer that stores and accesses files stored on a network, and especially for large files such as images. Computation complexity is reduced and efficiency improved. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 1 is a schematic illustration of computers in a network in accordance with an embodiment of the present invention;

FIG. 2 is a diagram of entries in a database useful with an embodiment of the present invention;

FIG. 3 is a diagram of entries in a database useful with an embodiment of the present invention;

FIG. 9 is a schematic illustration of computers in a network in accordance with an alternative embodiment of the present invention.

DETAILED DESCRIPTION OF THE INVENTION

Figure 4:
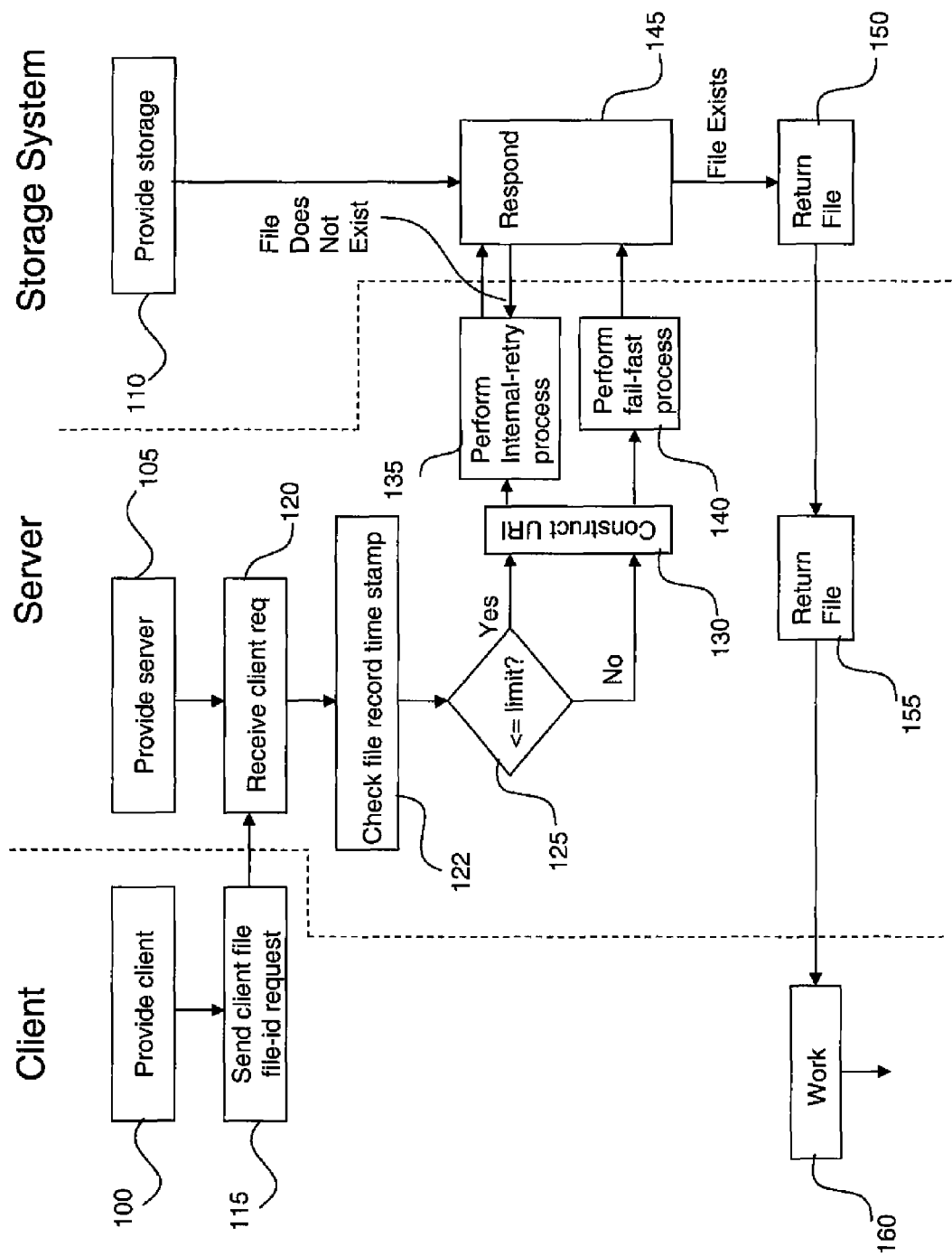
FIG. 4 is a detailed schematic flow graph of a method of the present invention.

FIG. 1 illustrates a network of computers useful in understanding the present invention. Referring to FIG. 1, a client 10 includes a computer 12 and a user agent 14. The user agent 14 can be a software application running on the computer 12 and accessed by a user through a graphical user interface, as is known in the art. The client 10 communicates with other computers through a network 40. In one preferred embodiment of the present invention, the client provides image processing, image storage, or image production services to the user. The software application can be a web browser running on a client computer 10 and interacting through the network to a server computer.

A server 20 includes a computer 22 connected to the network 40 and includes a file or database having file records 24 of data, for example digital images. The file records 24 do not include the actual digital image data but only references to them and, optionally, information about the digital image data. The file records, or database, can also include information about groups of images, for example a group of images used in an image product having multiple images, such as an album or photobook. The server 20 communicates with the client 10 through the network 40 and receives file operation requests from the client 10. The requests typically include a reference, name, or data-id of data that is to be operated upon. The server can provide web pages requested by the client. A server response to a client request can include data that is received and acted upon by the user agent, and can include information about how to retrieve files (e.g. images), such as universal resource indicators (URIs). This data could be HTML, XML, JSON, or ActionScript data. The received data can be a digital image and the file-id can be the file name. The database 24 can be a relational database and the file records can include metadata about the data in the file, for example information about a digital image or groups of digital images. A file metadata record can be referenced by a unique key, and can contain the time the client requested that the file be created and sufficient information to locate that file in a storage system 30.

The storage system 30 is also connected to the network 40. The storage system 30 includes, for example, a computer 32 and a file system 34, for example a database stored in a set of storage units, such as disks configured in a RAID array. The file storage system 34 stores files including, for example, digital images and digital image information (metadata) and includes supportive file database structures necessary for locating and retrieving digital information from the file storage devices, for example file sizes, partitions, file locations, etc., as are known in the electronic storage art.

Computers, computer networks, storage devices, user interfaces, and communication protocols that allow the various elements to communicate are commonplace network protocols and are all known in the art. The client, server, and computer storage computers execute software programs written to perform the tasks associated therewith.

The client 10 can be remote from the server 20 and the storage system 30, and communicates with the server 30 through a computer network such as the internet. The present invention is useful whether or not the client is remote from the server. The server 20 and storage system 30 can also interact through the internet, but higher performance can be achieved by locating the server 20 in close proximity with the storage system 30 in a private computer network to optimize system performance.

The server maintains a file record for each file (e.g. an image) created on storage system 30 for the user who operates client computer 10. Referring to FIG. 2, the metadata record for each file can include a unique file name, or a file-id that identifies the file, and a time stamp specifying the time when the file record was created and corresponds to the time at which a request is made to the storage system to create a file storage structure for the file. The record can include a unique key, for example the file-id. The record can also contain enough information to generate the URI of the file located on storage system 30.

Therefore, client requests to the server for file operations typically include a digital file name, file-id or other identification. The request can include a file itself, for example in an upload operation intended to transfer a digital image from the client to the storage system. The data stored in the database 30, or storage system, can be a function of the uploaded data. The uploaded data can be compressed or otherwise restructured, or processed, to optimize it for the storage system or for its intended application. Uploaded data can be processed to make retrieval of the uploaded data more efficient, for example, by modifying the storage format of the uploaded data. This type of data processing is commonly practiced by popular web sites that store large amounts of public user content.

In other cases, the file operations may handle requests for data to be retrieved from the storage system or indicate that certain tasks are to be performed upon, or make use of, the data. The server can generate a universal resource identifier (URI) from its file records based on the requested file name or other identification when handling requests for a specific file from the storage system, so that the URIs do not have be stored or maintained on the client. Referring to FIG. 3, the server request for a file can have a URI (e.g. URI-B) different from, and include different parameters than, a URI (e.g. URI-A) for a client request for the same file. Alternative access mechanisms, such as hyper-text transfer protocols can also be employed.

The storage system stores the actual data for each file required by the client in a file storage structure. The file storage structure can include the actual data, e.g. a digital image, as well as information about the data, such as its size, address, partition, etc. The file creation process can include the allocation of storage space, creating and storing supporting file system information, and the storage of data in the allocated storage space. The location of the file storage structure and data can be specified with a universal resource indicator (URI). When the storage system receives a file access request, for example, with a URI, from the server, the storage system can retrieve the associated file from storage. When the storage system receives a file storage request, for example as part of an upload process transferring a digital image from a client to the storage system, the storage system (or server) can create a new file storage structure and associated URI and then store the digital image in the indicated location. The stored data is not necessarily identical to the uploaded data itself, but can be, for example, a processed version of the data that is optimized for the storage system or for the intended application. For example, this can include images that are compressed.

Figure 6:
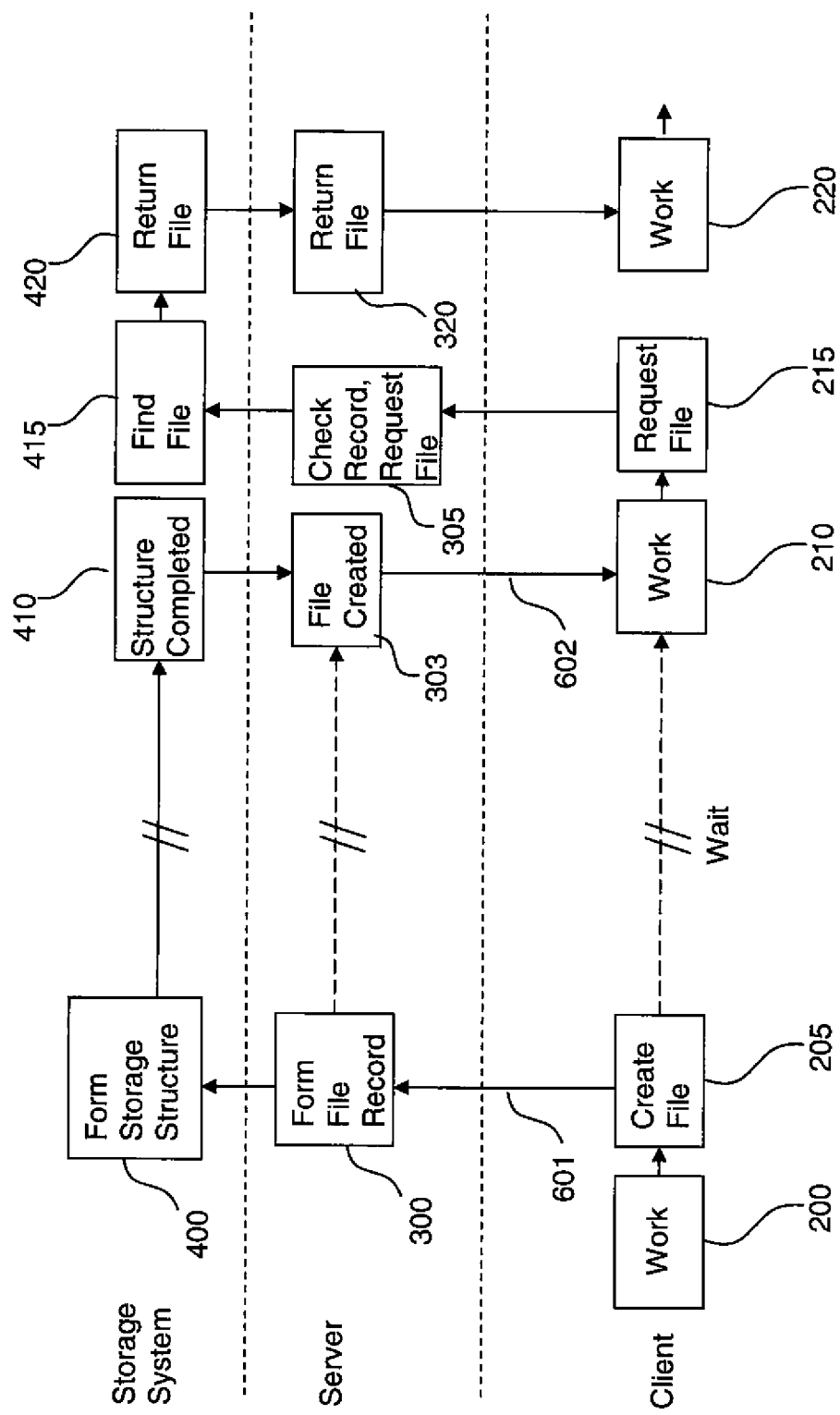
FIG. 6 is a general schematic flow graph of an alternative method of file storage access.

Referring to FIG. 6, an alternative image storage process that might be employed by those knowledgeable in the art is illustrated. A client computer is operated by a user, doing work of interest in step 200. At a next step 205, the user chooses to create a new image. The image is to be stored in the storage system, so the client sends a request to the server, as indicated by the arrow 601. The server creates a file record in step 300 and, in turn, sends a request to the storage system to create a new storage structure in step 400. The creation of the new storage structure, and optional upload of an image, can take time that is perceptible to a human. The user and client then wait, as does the server, until the storage system completes the construction of the file storage structure in step 410. The storage system then alerts the server that the file is created in step 303, and the client is then informed as indicated by arrow 602. After waiting for this chain of events to occur, the user can then continue with his or her work in step 210.

The user can then choose to request retrieval of the new image stored in the newly created file storage structure in step 215. The request goes to the server at step 305. The server checks its file records to see if it is an existing file then passes the request to the storage system in step 305. The storage system receives the server request in step 415 and returns the file to the server in step 420; the server in turn passes the image to the client in step 320. The client receives the requested image and continues work in step 220.

While this chain of events is straightforward, it has the drawback of requiring the user to wait while the initial image storage structure is created and the new image stored. Experience has shown that the delay is perceptible and objectionable to users and a different process could be useful to improve user satisfaction.

Figure 5:
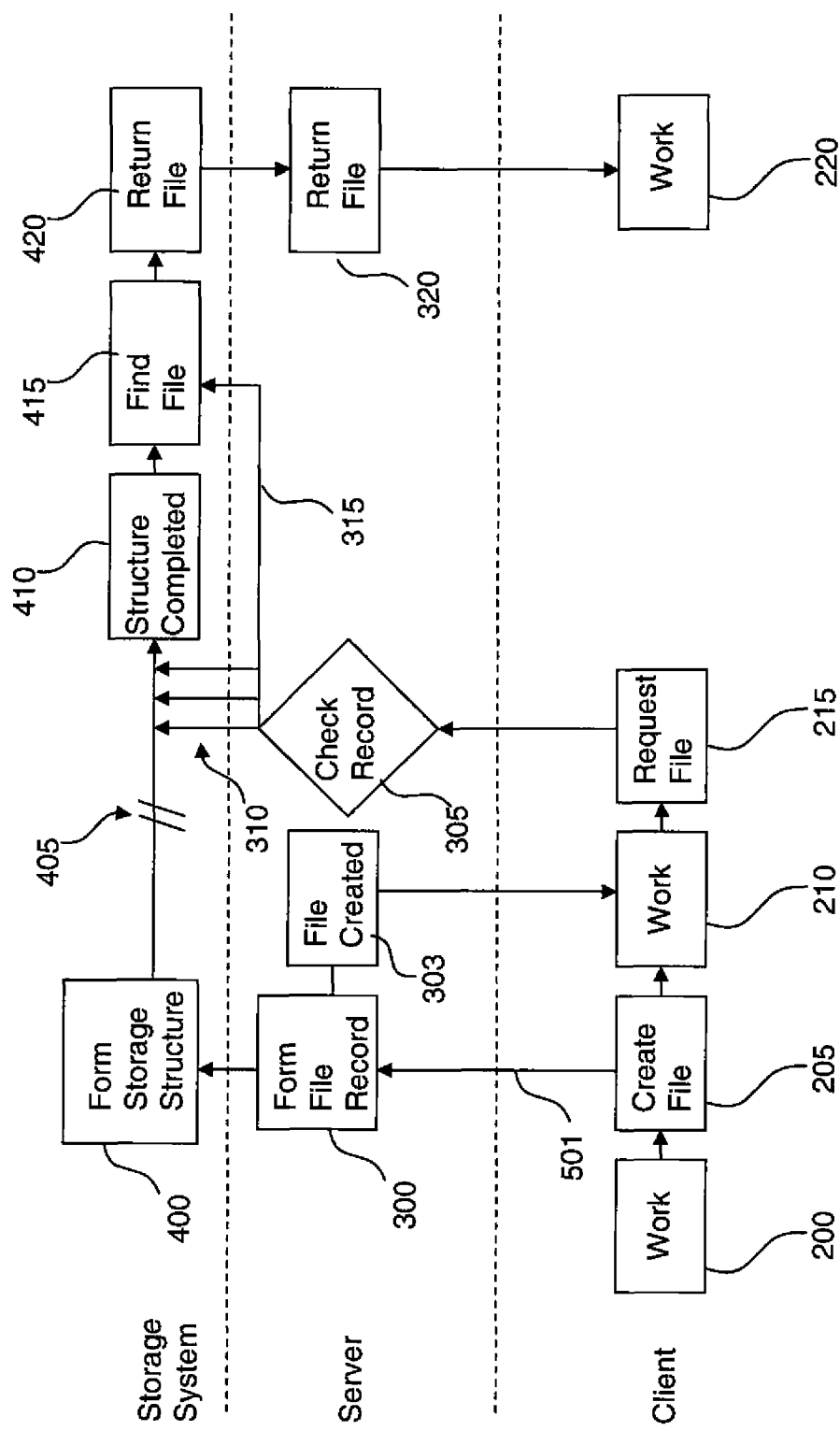
FIG. 5 is a general schematic flow graph of a method of the present invention.

Referring to FIG. 5, in an alternative method, a client is operated by a user, doing work of interest in step 200, as before. At a next step 205, the user chooses to create a new image. The image is to be stored in the storage system, so the client sends a request to the server, as indicated by the arrow 501. The server creates a file record in step 300 and, in turn, sends a request to the storage system to form a new storage structure in step 400. The storage system then begins the process of constructing the file storage structure in step 410 but the process takes some time, as indicated with the double slash 405.

Rather than waiting for the storage system to complete constructing the file storage structure and storing any file data, the server responds immediately to the client in step 303 with a "file created" message after forming the file record and sending the file creation request to the storage system in step 300. The client then continues work in step 210. If the client does not request the newly stored or created image file until the file storage structure is completed in step 410, no issues arise. However, if the client does request the newly stored or created image file before the file storage structure is completed, an issue does arise because a request to the storage system by the server will return an error or other indication that the requested image file does not exist. This potential problem can be dealt with as follows, with reference to FIG. 5.

The client requests the new image from the server in step 215. The server then checks its own file records to determine if a request to create the image file was previously received in step 305. Since the file record in the server was indeed created (in step 300), the server determines that the image requested either exists or will soon exist and passes the request to the storage system in step 310. If the image storage structure of the requested image does not yet exist, the storage server returns an error. The server receives the error message but polls the storage system again 310 at a pre-determined interval, until the image storage structure is available in step 410, after which a request 315 succeeds, the storage system finds the image in step 415, returns the image to the server in step 420, and the server returns the requested image to the client in step 320. The client then receives the requested image and continues work in step 220. If, however, there is an error in the storage system so that the requested file cannot be retrieved, the process described will result in an infinite loop of repeated requests 310 and a client and server that cannot proceed.

In order to provide improved responsiveness and efficiency, a preferred embodiment of the invention will now be described. In the case in which the file storage structure does not exist but is likely to exist soon, an internal-retry request will provide an improved user experience because the request will return the desired file rather than an error. If the file storage structure doesn't exist and is not likely to exist soon (e.g. file is absent due to a disk failure or shutdown), a fail-fast request provides an improved user experience because a user is not forced to wait for repeated failed file requests. Fail-fast requests are also less costly to process in terms of both server and file storage resources.

With respect to the server, when a file request is received by the server from the client, it is too costly to determine which type of response, retry or fail-fast, is most appropriate for this particular request. With respect to the client, a client cannot readily make a suitable file request since typical client-server communication protocols, such as hypertext transfer protocol, do not support such file requests, for example, a polling request. Hence, an alternative means for determining what type of file request should be used by the server is needed.

Figure 7:
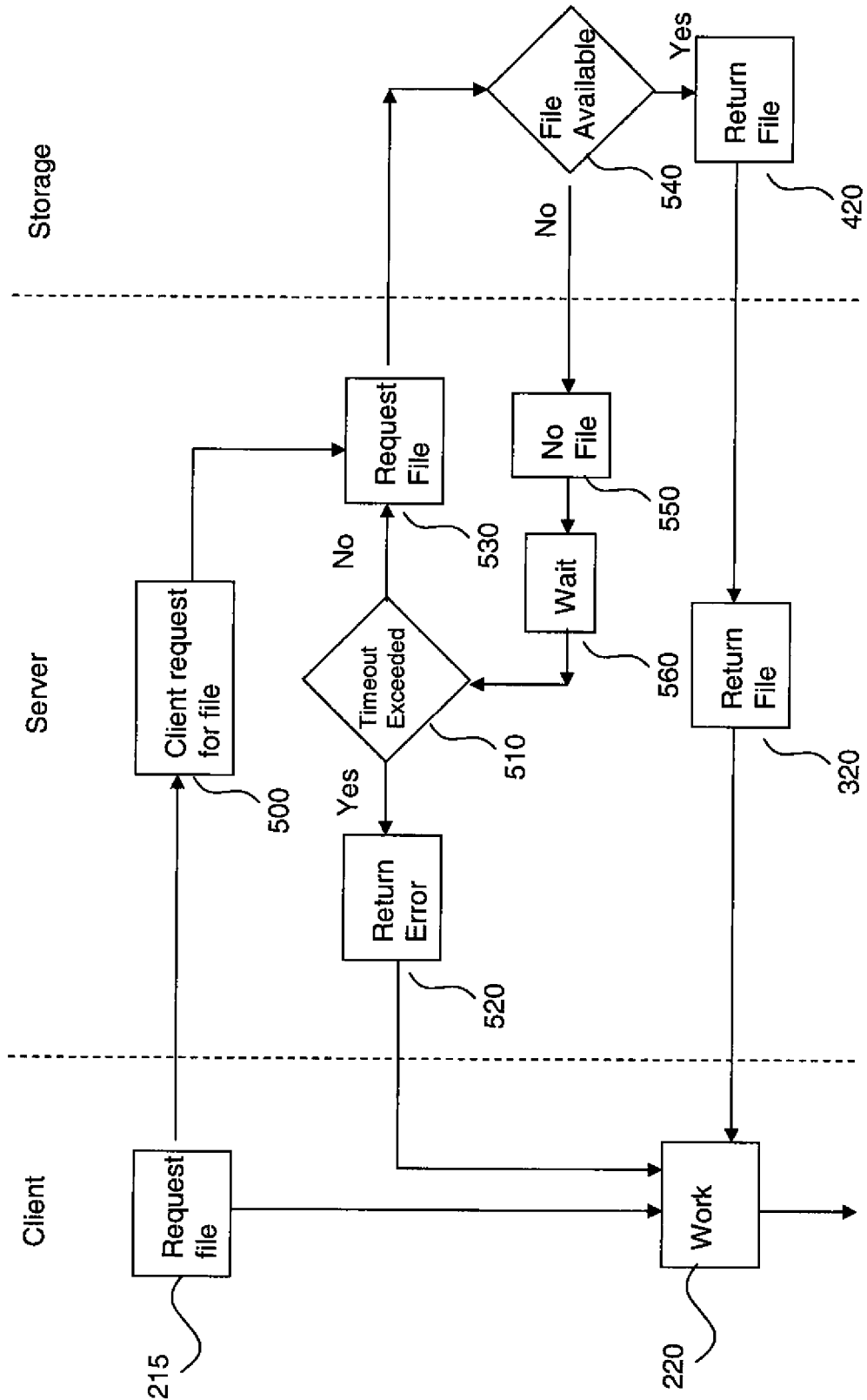
FIG. 7 is a schematic flow graph of an internal re-try method.

Referring to FIG. 7, an internal re-try (IR) request is a request from a server to a storage system in response to a client request for a file that requires repeated polling of the storage system if the file is not found. A client requests a file from the server in step 215. The server receives the request in step 500, checks its file records for the earlier file creation request, and, if the file creation request is confirmed, forwards the request to the storage system at step 530. If the file is not yet available at step 540, the storage system returns a "no file" (error) response in step 550. The server then idles for a programmed wait time in step 560 and then tests, in step 510, whether an elapsed time since the time that a request was made to create the file in the storage system (e.g. the file record time stamp) exceeds a pre-determined time-out value (e.g. 1 sec.). This is accomplished in the server via use of an internal clock and circuitry that determines a time difference between a current time and the time stamp of the initial request to create the file. The current time is the time when the server is determining the elapsed time, and which adjusts forward each time that the elapsed time determination is undertaken by the server. The current time can also be pegged at the time of receiving a request to retrieve the file or at the time of the last retry request, and which also adjusts forward each time that a retry is attempted by the server. Alternative elapsed times can also be implemented depending on server programming. If the time-out value has been exceeded by the elapsed time, the server returns an error response to the client in step 520. If the time-out value has not been exceeded by the elapsed time, the server again requests the file from the storage system in step 530. The storage system again checks to see if the file is available in step 540. If the file is available, then the file is returned to the server in step 420 and the server returns the file to the client in step 320. The client can then receive the file and return to work in step 220. If the file is again not available at step 540, the server again receives a no-file error signal from the storage system in step 550 and again idles in step 560 and then repeats the elapsed time/time-out test (step 510). The programmed wait time is typically selected to be less than the pre-determined time-out value, and can be zero. Non-zero wait times are typically used to avoid overloading the storage system with too many repeat requests in a short period of time. Note that the time-out test 510 can be programmed to occur before or after other steps, for example, before or after the wait step 560. The test is an "internal" test because the server is repeatedly requesting the file, rather than the client, thus leaving the client free to do other tasks and thereby improving user responsiveness. The server can more readily perform such retry operations since a standard user agent (e.g. a client) cannot readily perform such operations because standard internet interaction protocols (e.g. HTTP) do not include such facilities.

Figure 8:
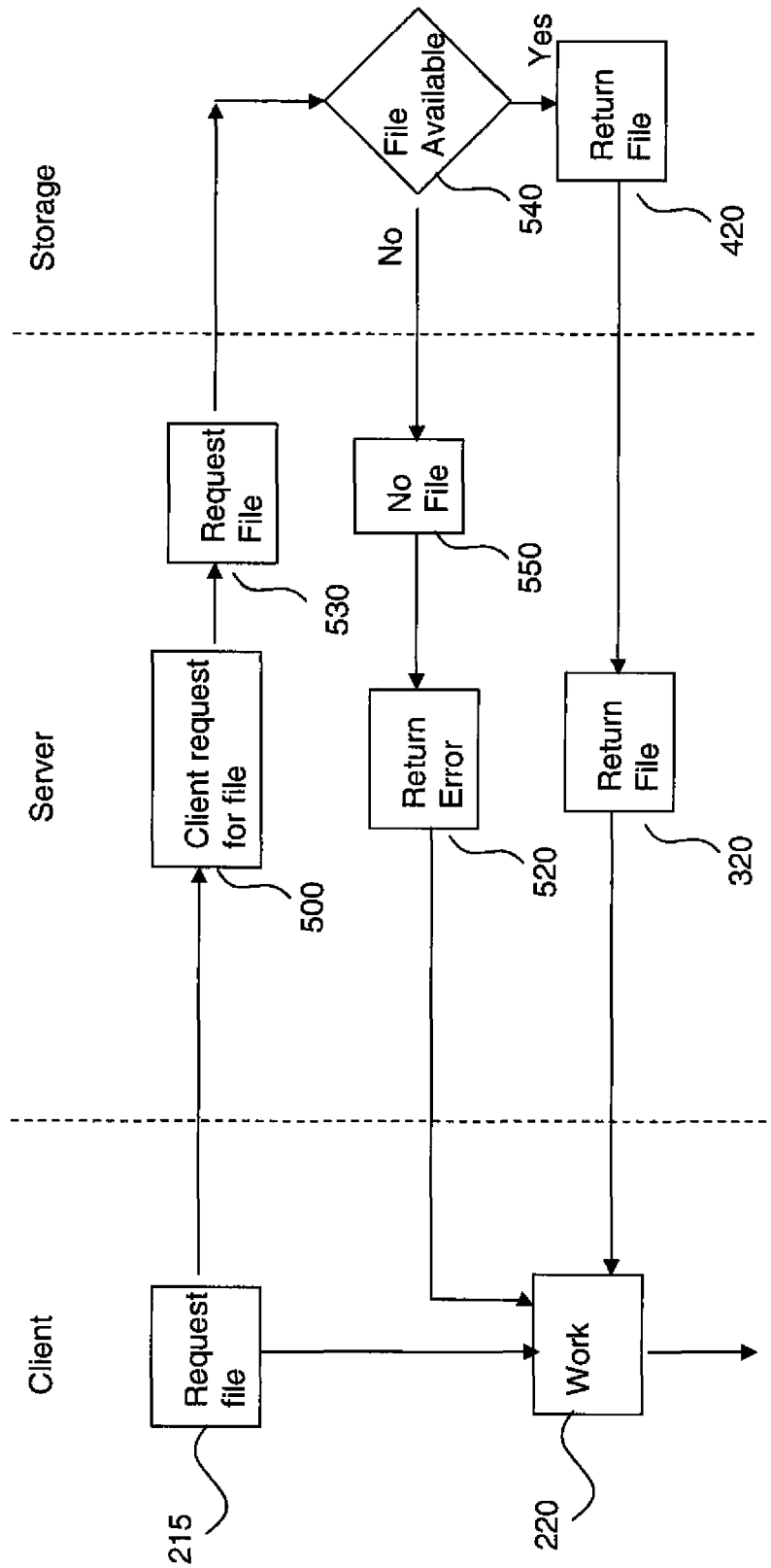
FIG. 8 is a schematic flow graph of a fast-fail method.

Referring to FIG. 8, a fail-fast (FF) request is a request from a server to a storage system that makes only a single attempt to access the file in response to a client request for the file. The client issues the request at step 215. The server receives the request in step 500, checks its file records for the earlier file creation request, and, if the file creation request is confirmed, requests the file from the storage system in step 530. The storage system checks to see if the file is available in step 540. If the file is available, then the file is returned to the server in step 420 and the server returns the file to the client in step 320. The client can then receive the file and return to work in step 220. If the file is not available at step 540, the server receives a no-file error signal from the storage system in step 550 and returns an error response to the client in step 520.

As can be seen from the different processes undertaken according to FIGS. 7 and 8, the fail-fast method will return a response to the server and the client faster than the internal-retry method for a storage system file request. Hence, when it is more likely that a file already exists, or does not exist and is not likely to exist soon, the fail-fast method is preferred, while when it is likely that a file will exist within the retry timeout interval, the internal-retry method is preferred because it will return the file rather than an error response.

As a practical example, a client with a web browser interface will often ask for multiple files all at once. For example in an image albuming application, when a user selects an album icon representing a group of images, the client can send the server a single request for the album. The server responds with an HTML document that contains many image URLs. In order to display that page, the browser must request every one of those images from the server, before the images can be displayed by the browser. Hence, it is important for the image access to be as efficient as possible and to take as little time as possible.

To provide efficient image access, the server can treat a single request for multiple data sets differently than multiple requests for single data sets, even if the number of data sets is the same. For example, the server can test the creation date of an album or retrieve the creation dates of the images in the album in a single database query, and then select the appropriate fast-fail or internal-retry access request for each image. This can be more efficient than making multiple database requests, one for each image, and then selecting the appropriate fast-fail or internal-retry access request for each image. The latter approach means that the image URLs must be processed by a general purpose software layer (e.g. Java) that implements the testing logic for each image. Such a design is quite inefficient in terms of infrastructure load and can be slower for the user as well.

To assist in providing responsive performance to the client, the file record, shown in FIG. 2, maintains a time stamp of the time at which the server was requested by the client to create a digital image file in the storage system. This time stamp can be stored in a file record on the server. If, when an image URI is requested by the client, the elapsed time since the file creation request is less than or equal to the pre-determined time-out value, the file is requested with an internal-retry request. If, when a file URI is requested by the client, the elapsed time since the file creation request is greater than the pre-determined time-out value, the file is requested with a fail-fast request. The pre-determined limit can be, for example, one second. The selection of internal-retry versus fail-fast requests has been shown to provide improved performance with reduced complexity compared to other alternatives.

Hence, according to an embodiment of the present invention, a computer system for managing client requests in a computer network includes a server having a plurality of file records, each record including a timestamp indicating the time at which a request was made to create a file in the storage system, the server being responsive to client file requests. The system further includes a storage system for storing identified files, e.g. digital images, the storage system being responsive to internal-retry and fail-fast requests for the identified files from the server. In response to a client request for a file whose file record time stamp indicates that an elapsed time since a request was made to create the file is less than or equal to a predetermined time limit, the server makes an internal-retry request for the file from the storage system and, in response to a client request for a file whose time stamp indicates that an elapsed time since a request was made to create the file is greater than the predetermined time limit, the server makes a fail-fast request for the file from the storage system.

In a further embodiment of the present invention, a URI is used for identifying the file. The identifier can be generated by the server in response to a request from the client. Hence, when the server receives a request to create and fill a file storage structure with data, it generates a URI and it creates a time-stamped file record for the requested file, and requests the storage system to create and fill the file storage structure. A URI can be created by the server for the file storage structure or may be returned from the storage system to the server, or the URI can be constructed as needed by an algorithm, for example a hashing algorithm in which a name or file-id can be used to construct the URI.

The present invention is particularly useful when the elapsed time required for the storage system to create and fill the file storage structure is perceptible to humans, for example when the time required for the storage system to create the image storage structure is greater than one second. The time required to form the file storage structure can include the time necessary to store a digital file in the file storage structure.

Referring to FIG. 4, in one embodiment of the present invention, a method of managing file resource requests over a network comprises the steps of providing a server having a plurality of file records at 105, each file record includes a timestamp indicating the time at which a request was made to create the file and at which time the file record was created. The server responds to the client for file requests. The method also includes providing a storage system for storing identified files at step 110, the storage system being responsive to internal-retry and fail-fast requests for the identified files. A client is provided in step 100.

In this example, a single file at a time is requested by the client. The client sends a request including a file-id or name to the server in step 115. The server receives the request for an identified file in step 120. The server tests the timestamp of the file record of the requested file in step 122. The timestamp is compared to the current time at step 125 to determine the elapsed time since a request was made to create the file storage structure. If the elapsed time is less than or equal to a predetermined time limit, the identified file is requested from the storage system with an internal-retry process in step 135. If the elapsed time is greater than the predetermined time limit, the identified file is requested from the storage system with a fail-fast process in step 140. In either case, the server can create a corresponding URI at an intermediate step 130 and provide the URI to the storage system. The storage system responds at step 145 to the request by locating the requested file, if it exists.

If the requested file exists, the storage system returns the requested file to the server in step 150, and the server returns the requested file to the client in step 155. The client then continues work in step 160.

If the requested file does not exist it can be because the corresponding file storage structure does not yet exist but is being constructed. This is the assumed situation if an error is returned by the storage system when the elapsed time is less than or equal to the predetermined limit. In this case, the server can repeatedly make another internal-retry request 135 until the file storage structure exists and is returned 150. (The file request step 530, response 550, wait step 560, time out step 510, and returned error in step 520 of FIG. 7 are not illustrated in FIG. 4 but can be included as an optional routine as part of the internal re-try process 135.)

If the elapsed time is greater than the predetermined limit, it is assumed that if no file storage structure exists, there is a fault (e.g. bad disk, corrupted information, disk shutdown). In this case, the server awaits the return of a fail-fast request 140 until an error is returned (i.e., steps 550 and 520 as shown in FIG. 8 are performed here, but are not shown in FIG. 4).

If the file does exist, either an internal-retry or a fail-fast request will immediately return the image 150.

Referring to FIG. 9, a client can request a group of images, for example associated with an album or photobook. It is possible, depending on the client software implementation, that the client does not have the individual URIs for all of the files in the group, since the group can be managed by the server and it is desirable to maintain as little information as possible on the client. In this case, the client can request the group of images from the server in step 114. The server receives the request in step 119, and assembles a list of files, e.g. images, in the group. Each file record is examined (step 121), as before, to determine the elapsed time (step 122), and the elapsed time is compared to the limit (step 125). Since it is not yet known whether the client desires all of the files in the group or only a subset of the files in the group, a URI for each of the files in the group is constructed and a query parameter included in the associated URI if the elapsed time is within the limit and a query parameter is not included in the associated URI if the elapsed time is not within the limit. The query parameter association is arbitrary and could be associated with the URIs in reverse. The URI list is returned in step 154. The query parameter is simply an indicator and could be simply a bit in a record or header, for example in the URI.

The client then requests the desired file or files from the server in step 115. The server receives the request in step 120. Since the determination of elapsed time is already done, the server can simply test the URIs for the presence of the query parameter (step 126). If the query parameter is present in the URI the internal re-try process is performed (step 135) and if the query parameter is not present in the URI, the fail-fast process is performed (step 140). The internal re-try and fail-fast processes are performed as before and the storage system responds as before (step 145), e.g., as in FIG. 4. The remaining steps of returning files to the server (step 150) which in turn returns the files to the client (step 155) and the client proceeds with work (step 160) are identical to those shown in FIG. 4 and are omitted from FIG. 9.

In an alternative embodiment of the present invention, the server could return a list of file URIs without query parameters to the client and the client could request the files individually, or as a group, from the server as illustrated in FIG. 4.

The present invention can be employed to support businesses conducted over the internet, in particular businesses that employ large amounts of digital storage, such as image printing with a client that interacts with a server and image storage system. It has been shown that improved responsiveness, improved computational efficiency, and reduced complexity are provided by using the various methods of the present invention.

The invention has been described in detail with particular reference to certain preferred embodiments thereof, but it will be understood that variations and modifications can be effected within the spirit and scope of the invention.

PARTS LIST 10 client
12 computer
14 user agent
20 server
22 computer
24 file records
30 storage system
32 computer
34 file storage
40 network
100 provide client step
105 provide server step
110 provide storage system step
114 send group request step
115 send file request step
119 receive group request step
120 receive file request step
121 repeat for each file step
122 check file time stamp step
125 test elapsed time step
126 test URI query step
130 construct URI step
131 construct URI with query parameter step
132 construct URI without query parameter step
135 make asynchronous request step
140 make synchronous request step
145 respond step
150 storage system return file step
154 server return file list step
155 server return file step
160 receive file and continue work step 200 work step
205 create file step
210 work step
215 request file step
220 work step
300 create file record step
303 file created step
305 check file record step
310 poll request step
315 request file step
320 return file step
400 form new storage structure
405 wait step
410 structure completed step
415 find file step
420 return file step
500 client request received step
501 arrow
510 test timeout step
520 return error step
530 request file step
530 client request received step
540 check file step
550 received no file step
560 wait step
601 arrow
602 arrow

The invention claimed is:

1. A method of managing file resource requests over a computer network, comprising:
   providing, by a server, timestamps for a plurality of file records, wherein each timestamp indicates the time at which a request was made to create a file;
   receiving, by the server, a client request for one or more files from a client;
   comparing, by the server, the timestamp of each file to a present time to determine an elapsed time for each file;
   requesting, by the server, each file having an elapsed time less than or equal to a pre-determined time limit from a storage system with an internal-retry request; and
   requesting, by the server, each file having an elapsed time greater than the pre-determined time limit from the storage system with a fail fast request.

2. The method of claim 1, further comprising constructing a universal resource indicator (URI) with a query parameter for each file having an elapsed time less than or equal to a pre-determined time limit, and constructing a URI without the query parameter for each file having an elapsed time greater than a pre-determined time limit.

3. The method of claim 2, further comprising requesting a file from the storage system with an internal re-try request if the URI associated with the file has a query parameter and requesting a file from the storage system with a fail-fast request if the URI associated with the file does not have a query parameter.

4. The method of claim 3, further comprising:
   receiving a request for a group of files from the client by the server;
   forming URIs for each file in the group; communicating the URI for each file in the group to the client from the server;
   receiving a request for one or more files from the client by the server; and
   requesting each of the files from the storage system using an internal re-try request if the URI associated with the file has a query parameter and requesting each of the files from the storage system using a fail-fast request if the URI associated with the file does not have a query parameter.

5. The method of claim 1, further comprising returning the requested file from the storage system to the server and from the server to the client.

6. The method of claim 1, further comprising forming a universal resource indicator for the requested file.

7. The method of claim 1, further comprising receiving a client request to create a file storage structure, forming a file record including a time stamp, and forming a file storage structure in the storage system in response.

8. The method of claim 7, wherein forming a file storage structure in the storage system includes forming the file storage structure in a human-perceptible amount of time.

9. The method of claim 8, wherein forming a file storage structure in the storage system further includes forming the file storage structure in more than one second.

10. The method of claim 1, further including a remote client communicating with the server over a network.

11. The method of claim 10, further including a remote client communicating with the server through a user agent interface.

12. The method of claim 1, further including providing a database for storing file access and timestamp information.

13. The method of claim 12, further including requesting information about a plurality of files from the database in a single request.

14. A method comprising:
   receiving, by a server, a digital file, and an electronic request for storing the digital file, over a communication network from a network connected computer;
   forwarding, by a server, the digital file to a storage system that is coupled to the communication network, including starting a process for storing the digital file in the storage system;
   receiving, by a server, a request to retrieve the digital file over the communication network from the network connected computer;
   determining, by a server, an elapsed time from the time of receiving the request for storing the digital file to the time of receiving the request to retrieve the digital file; and
   requesting, by a server, the storage system retrieve the digital file file and, in response to receiving a no-file response from the storage system, if the elapsed time is determined to exceed a programmed time-out value, forwarding the network connected computer the no-file response, and, if the elapsed time is determined to be less than the programmed time-out value, retrying the request.

15. The method of claim 14, wherein determining an elapsed time includes determining an elapsed time from the time of receiving the request for storing the digital file to the time of the last retry, and wherein determining whether to retry the requesting repeatedly results in a retry each time that the elapsed time is determined to be less than the programmed time-out value and the storage system sends a no-file message.

16. The method of claim 14, further comprising waiting for a programmed wait time before performing the retry.

17. An apparatus comprising:
   a computer interface configured to:
   receive a digital file and an electronic request for storing the digital file over a communication network from a network connected computer; and forward the digital file to a storage system that is coupled to the communication network; and a processing system configure to:
upon receiving a request to retrieve the digital file over the communication network from the network connected computer, determine an elapsed time from the time of receiving the request for storing the digital file to the time of receiving the request to retrieve the digital file;
request the storage system retrieve the digital file; and
in response to receiving a no-file response from the storage system, if the elapsed time is determined to exceed a programmed time-out value, forward the network connected computer the no-file response, and, if the elapsed time is determined to be less than the programmed time-out value, retry the request.

18. The apparatus of claim 17, wherein the processing system is configured to determine whether to retry the request repeatedly and, if so, the repeated request results in a retry each time that the elapsed time is determined to be less than the programmed time-out value and the storage system sends a no-file message.

19. A system comprising:
a server computer configured to receive a digital file and an electronic request for storing the digital file over a communication network from a network connected computer;
a storage system configured to store the received digital file;
a processing system configured to:
determine an elapsed time from the time of receiving a request for storing the digital file to a time of receiving a request to retrieve the digital file;
request the digital file be retrieved from the storage system; and
in response to receiving a no-file response from the storage system,
if the elapsed time is determined to exceed a programmed time-out value,
forward the network connected computer the no-file response; and
if the elapsed time is determined to be less than the programmed time-out value, retry the request.

20. The server of claim 19, wherein the processing system is further configured to construct a universal resource indicator (URI) with a query parameter for each file having an elapsed time less than or equal to a pre-determined time limit, and to construct a URI without the query parameter for each file having an elapsed time greater than a pre-determined time limit.

21. A non-transitory computer-readable medium having instructions stored thereon that, upon execution by a computing device, cause the computing device to perform operations comprising:
providing timestamps for a plurality of file records, wherein each timestamp indicates the time at which a request was made to create a file;
receiving a client request for one or more files from a client;
comparing the timestamp of each file to a present time to determine an elapsed time for each file;
requesting each file having an elapsed time less than or equal to a pre-determined time limit from a storage system with an internal-retry request; and
requesting, by the server, each file having an elapsed time greater than the pre-determined time limit from the storage system with a fail fast request.

22. A non-transitory computer-readable medium having instructions stored thereon that, upon execution by a computing device, cause the computing device to perform operations comprising:
receiving a digital file, and an electronic request for storing the digital file, over a communication network from a network connected computer;
forwarding the digital file to a storage system that is coupled to the communication network, including starting a process for storing the digital file in the storage system;
receiving a request to retrieve the digital file over the communication network from the network connected computer;
determining an elapsed time from the time of receiving the request for storing the digital file to the time of receiving the request to retrieve the digital file; and
requesting the storage system retrieve the digital file; and
in response to receiving a no file response from the storage system, if the elapsed time is determined to exceed a programmed time-out value, forwarding the network connected computer the no-file response, and, if the elapsed time is determined to be less than the programmed time-out value, retrying the request.

* * * * *

UNITED STATES PATENT AND TRADEMARK OFFICE
CERTIFICATE OF CORRECTION

| | | |
|---|---|---|
| PATENT NO. | : 8,762,775 B2 | Page 1 of 1 |
| APPLICATION NO. | : 12/789504 | |
| DATED | : June 24, 2014 | |
| INVENTOR(S) | : Hsu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this
Eleventh Day of August, 2015

Michelle K. Lee
*Director of the United States Patent and Trademark Office*